3,579,354
PREPARATION OF AN ELASTIC CHEESE PRODUCT
Robert L. Kasik and Anthony J. Luksas, Chicago, Ill., assignors to Beatrice Foods Co., Chicago, Ill.
No Drawing. Filed Aug. 1, 1968, Ser. No. 749,309
Int. Cl. A23c 19/02
U.S. Cl. 99—116                12 Claims

ABSTRACT OF THE DISCLOSURE

An elastic cheese product is made by inoculating sodium caseinate containing butterfat with lactic acid organisms in aqueous medium, then inoculating with a micrococcus, fermenting aerobically until the system becomes elastic and plastic, then acidifying the pH 4.5 and drying.

A bland product can be prepared by growing trained *Streptococcus lactis* and/or micrococci on aqueous sodium caseinate, acidifying, removing the liquid, resuspending with aid of alkali to pH 6–7 and drying.

---

The present invention relates to the preparation of novel products from sodium caseinate.

Sodium caseinate as available today has an objectionable flavor and odor.

It is an object of the present invention to prepare a bland sodium caseinate free of objectionable flavor and odor.

Another object is to prepare an elastic cheese product.

A further object is to develop a substitute for mozzarella or scamorzo cheese.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by the procedures set forth below.

The objectionable flavor and odor of sodium caseinate can be readily eliminated and a bland product obtained by growning trained *Streptococcus lactis* or *Micrococcus caseolyticus* or *Micrococcus freudenreichii* on aqueous sodium caseinate, acidifying the mixture, removing the liquid, resuspending the solid by raising the pH and drying.

The *Streptococcus lactis* is grown aerobically for 12 to 48 hours, preferably 24 hours on the aqueous medium containing 1 to 20%, preferably not over 15%, of sodium caseinate although the aqueous medium can contain sodium caseinate up to its saturation point. The *Micrococcus caseolyticus* or *Freudenreichii* are grown aerobically for 24 to 72 hours, preferably 48 hours, on the same medium either by themselves or more preferably together with *Streptococcus lactis*. While the micrococci are slower growing than *Streptococcus lactis* they have the advantage of eliminating any bitter tastes.

The acidification is accomplished by the lactic acid forming bacteria and is preferably brought to the isoelectric point, about pH 4.5, to precipitate the protein.

The *Streptococcus lactis* or other microorganism is trained to grow in the sodium caseinate system by 3 to 5 transfers from one aqueous sodium caseinate mixture to other aqueous sodium caseinate mixtures.

The microorganisms are preferably incubated at 32° C. in the processes of the present invention but they can be grown at 10 to 40° C. Longer time periods of growth of course are required when using nonoptimum growth temperatures.

The pH is then raised to 6 to 7 with any nontoxic alkaline material, e.g., sodium hydroxde, potassium hydroxide, sodium carbonate, potassium carbonate, ammonium hydroxide, sodium bicarbonate and potassium bicarbonate. The sodium caseinate is there resuspended in water, e.g., as a suspension of from 1% to the limit of solubility of the caseinate (about 25%), but preferably not over 15%. The sodium caseinate is then dried, preferably by spray drying to obtain a bland sodium caseinate free of sodium caseinate flavor and odor.

Unless otherwise indicated all parts and percentages are by weight.

EXAMPLE 1

A 10% aqueous sodium caseinate mixture was sterilized and inoculated with *Streptococcus lactis* (previously trained to grow aerobically on aqueous sodium caseinate by 5 consecutive transfers from one 10% aqueous sodium caseinate mixture of another after 24-hour intervals). The *Streptococcus lactis* was allowed to grow aerobically for 24 hours at 32° C. until the caseinate had precipitated. The caseinate was resuspended as a 10% solid aqueous mixture by raising the pH to 6.5 with sodium hydroxide. The product was then heated to sterilize it and spray dried to give a sodium caseinate powder which was bland in character and was devoid of the usual undesirable sodium caseinate flavor and odor.

EXAMPLE 2

The procedure of Example 1 was repeated except that a mixture of *Streptococcus lactis* and *Micrococcus caseolyticus* was employed and the growth was continued for 48 hours. The spray dried product was bland like that of Example 1.

The procedure set forth above is the preferred way of obtaining a bland sodium caseinate since it can be done readily and does not require washings since the objectionable character is eliminated by the microbiological activity.

A less preferred method for preparing a bland sodium caseinate is to dispense sodium caseinate in water, e.g., at 1 to 20% concentration, precipitate it by acidification, washing with water, suspending the precipitate in water with the aid of an alkaline material such as those set forth above and repeating the process at least 3 and preferably 4 or more times. Acidification is preferably to a pH of about 4.5 but can be as low as 3.2 or as high as 4.7. Even higher pH can be used, e.g., 5.2 by heating, e.g., to 40° C. to cause coagulation. Any nontoxic acid can be employed, e.g., lactic acid, citric acid, hydrochloric acid, sulfuric acid, malic acid, chloroacetic acid.

EXAMPLE 3

Sodium caseinate was dispersed as a 10% solution in water using sodium hydroxide to give a pH of 6.5 Lactic acid was added to reduce the pH to 4.5. The liquid was squeezed out of the precipitate by centrifuging. The sodium caseinate was again dispersed as a 10% solution in water by adding sufficient amount of sodium hydroxide with the water to impart a pH of 6.5. The precipitation, liquid removal and redispersion procedure was repeated three more times and then the sodium caseinate dispersion was spray dried to give a bland sodium caseinate free of characteristic objectionable sodium caseinate flavor and odor.

In another aspect of the present invention there is prepared an elastic cheese product which is useful as a substitute for mozzarella or scamorzo cheese.

An aqueous dispersion of 1 to 15% (or even up to 20%), preferably 10%, of sodium caseinate and up to 30% of butterfat, e.g., 1 to 30% butterfat, preferably 5% of butterfat, in water is sterilized. Then the mixture is inoculated either statically or with stirring with *Streptococcus lactis* but no areation is provided and the bacteria are allowed to grow 12 to 48 hours. Then the system is inoculated with micrococci, e.g., *Micrococcus caseolyticus* or *Micrococcus freudenreichii* and fermented aerobically with agitaion in the liquid state for 24 hours to 12 days, preferably 2 to 3 days, until the system becomes elastic and plastic in consistency. It is then acidified with any nontoxic acid such as those specified above for example. Acidification should be sufficient to coagulate the product. The acidification is usually to a pH of 4.7 to 3.2, preferably 4.5 but can be as high as 5.2 if heating, e.g., to 40° C. is used to aid in coagulation. The acidification is desirably to the isoelectric point of the casein.

The acidification should be done before adverse flavor develops, as the flavor increases the elastic properties drop off.

After acidification the liquid is expelled by drying, e.g., squeeze bag drying or centrifuging. The product in this form is elastic and plastic and can be sold as such as a replacement for mozzarella or scamorzo cheese. There should be retained enough moisture in the product, e.g., 5 to 10% to insure a plastic consistency.

If a dry powder product is desired the liquid can be removed by spray drying, roller drying or other conventional drying technique and reconstituted with sufficient water, e.g. 5 to 10%, at the point of use to render the product elastic. Alternatively, the particles of dry powder can be melted together to give a product resembling mozzarella or scamorzo cheese.

After acidification, e.g., to a pH of 4.5 the precipitated sodium caseinate can be resuspended in water at 1 to 15%, preferably 10% concentration, broken down into fine particles, e.g., by homogenizing at 500–1500 p.s.i. followed by spray drying or roller drying to give a powder product. For roller drying it is essential that the body of the product be broken down.

The bacteria are allowed to grow at 10 to 40° C., preferably 32° C.

Of the fats tried only butterfat was effective in giving the desired mozzarella cheese type product.

EXAMPLE 4

A sterile aqueous dispersion containing 10% sodium caseinate and 5% butterfat was inoculated statically with *Streptococcus lactis* and the microorganism allowed to grow at 32° C. for 24 hours without aeration. The mixture was then inoculated with *Micrococcus caseolyticus* which was allowed to stand at 32° C. for 3 days while the liquid mixture was aerated and agitated. The system became elastic and plastic. The mixture was then acidified with lactic acid to a pH of 4.5 and the liquid expelled to give an elastic and plastic mozzarella cheese like product containing 8% moisture.

EXAMPLE 5

Example 4 was repeated. The product was suspended at 10% solids in water having a pH of 6.5, homogenized a 1000 p.s.i. and spray dried to give a powder. This product can be sold as such even though it is no longer elastic. By adding 10% water to the product an elastic and plastic product was obtained suitable as a substitute for mozzarella or scamorzo cheese.

What is claimed is:

1. A process of making a plastic and elastic product resembling mozzarella and scamorzo cheese comprising growing *Streptococcus lactis* for at least 12 hours on an aqueous medium at temperatures between 10 and 40° C. which medium contains 1 to 20% of sodium caseinate and 1 to 30% of butterfat without substantial aeration and then inoculating the mixture with *Micrococcus caseolyticus* or *Micrococcus freudenreichii*, allowing the organisms to grow aerobically in the liquid system for 1 to 12 days until the system becomes elastic and plastic in consistency, and acidifying the final system to precipitate the protein before adverse flavor develops.

2. The product prepared by the process of claim 1.

3. A process according to claim 1 including the step of expelling most of the moisture from the product but retaining sufficient moisture to maintain plastic consistency.

4. A process according to claim 1 including the step of removing substantially all of the moisture by drying to form a powder and eliminate the elastic consistency of the product.

5. A process according to claim 1 wherein the Micrococcus is *Micrococcus caseolyticus* and the aqueous mixture contains 10% sodium caseinate and 5% butterfat.

6. A process of preparing a bland sodium caseinate comprising training at least one microorganism selected from *Streptococcus lactis*, *Micrococcus caseolyticus* and *Micrococcus freudenreichii* to grow on sodium caseinate by consecutive transfers from one aqueous medium consisting essentially of sodium caseinate to another, placing at least one of the trained organisms in an aqueous medium consisting essentially of sodium caseinate and growing the trained organisms for a time sufficient to destroy the sodium caseinate flavor and odor, acidifying the mixture to reduce the pH to the point that casein precipitates, removing the liquid, resuspending the precipitate in water having a pH of at least 6 and drying.

7. A process according to claim 6 wherein the resuspension is at a pH of 6 to 7.

8. A process according to claim 6 wherein the growing organism comprises *Streptococcus lactis*.

9. A process according to claim 6 wherein the growing organism comprises a Micrococcus.

10. A process according to claim 9 wherein the growing organism is a mixture of *Streptococcus lactis* and *Micrococcus caseolyticus*.

11. A process according to claim 6 wherein the drying is spray drying.

12. A process according to claim 6 wherein the pH of precipitation is about 4.5.

References Cited

UNITED STATES PATENTS

| | | | |
|---|---|---|---|
| 3,364,034 | 1/1968 | Hoersch et al. | 99—98 |
| 2,044,282 | 6/1936 | Clickner | 99—20 |
| 2,468,730 | 5/1949 | Block et al. | 260—120 |
| 2,639,235 | 5/1953 | Kennedy et al. | 99—20 |
| 3,117,008 | 1/1964 | Mauk | 99—116 |
| 3,420,742 | 1/1969 | Fatt et al. | 99—116X |

OTHER REFERENCES

Hall et al.: "Drying Milk and Milk Products," The Avi Publ. Co., Inc., Westport, Conn., 1966 (p. 185), SF259 H19C.2.

LIONEL M. SHAPIRO, Primary Examiner

D. M. NAFF, Assistant Examiner

U.S. Cl. X.R.

99—20; 260—120